United States Patent [19]
Butler

[11] 3,916,701
[45] Nov. 4, 1975

[54] ROTARY WRIST ACTUATOR FOR INDUSTRIAL ROBOTS

[75] Inventor: James R. Butler, Lima, Ohio

[73] Assignee: Automation Products, Inc., Elida, Ohio

[22] Filed: Apr. 17, 1973

[21] Appl. No.: 352,044

[52] U.S. Cl.................................. 74/57; 214/651
[51] Int. Cl............................................ F16h 25/12
[58] Field of Search.......... 74/57; 214/1 CM, 1 BC, 214/1 BD, 141; 182/2

[56] References Cited
UNITED STATES PATENTS

| | | | |
|---|---|---|---|
| 2,679,165 | 5/1954 | Montgomery | 74/57 |
| 2,872,825 | 2/1959 | Van Doren | 74/57 |
| 2,933,210 | 4/1960 | Dye | 214/651 |
| 3,454,169 | 7/1969 | Bridges | 74/57 |
| 3,625,304 | 12/1971 | Siefermann | 182/2 |

Primary Examiner—Samuel Scott
Assistant Examiner—Wesley S. Ratliff, Jr.
Attorney, Agent, or Firm—Wood, Herron & Evans

[57] ABSTRACT

An industrial robot for grasping, manipulating and moving parts is disclosed. The robot includes a telescoping boom assembly mounted for movement about two orthogonal axes. A part gripper is mounted on the forwardmost end of the telescoping boom assembly. The gripper is rotatably movable about a third axis which is substantially parallel to the longitudinal axis of the telescoping boom assembly. The gripper is rotated about this third axis by a powered rotary actuator mounted within the forwardmost telescoping boom element and includes an hydraulically actuated linear to rotary converter.

2 Claims, 3 Drawing Figures

U.S. Patent Nov. 4, 1975 3,916,701
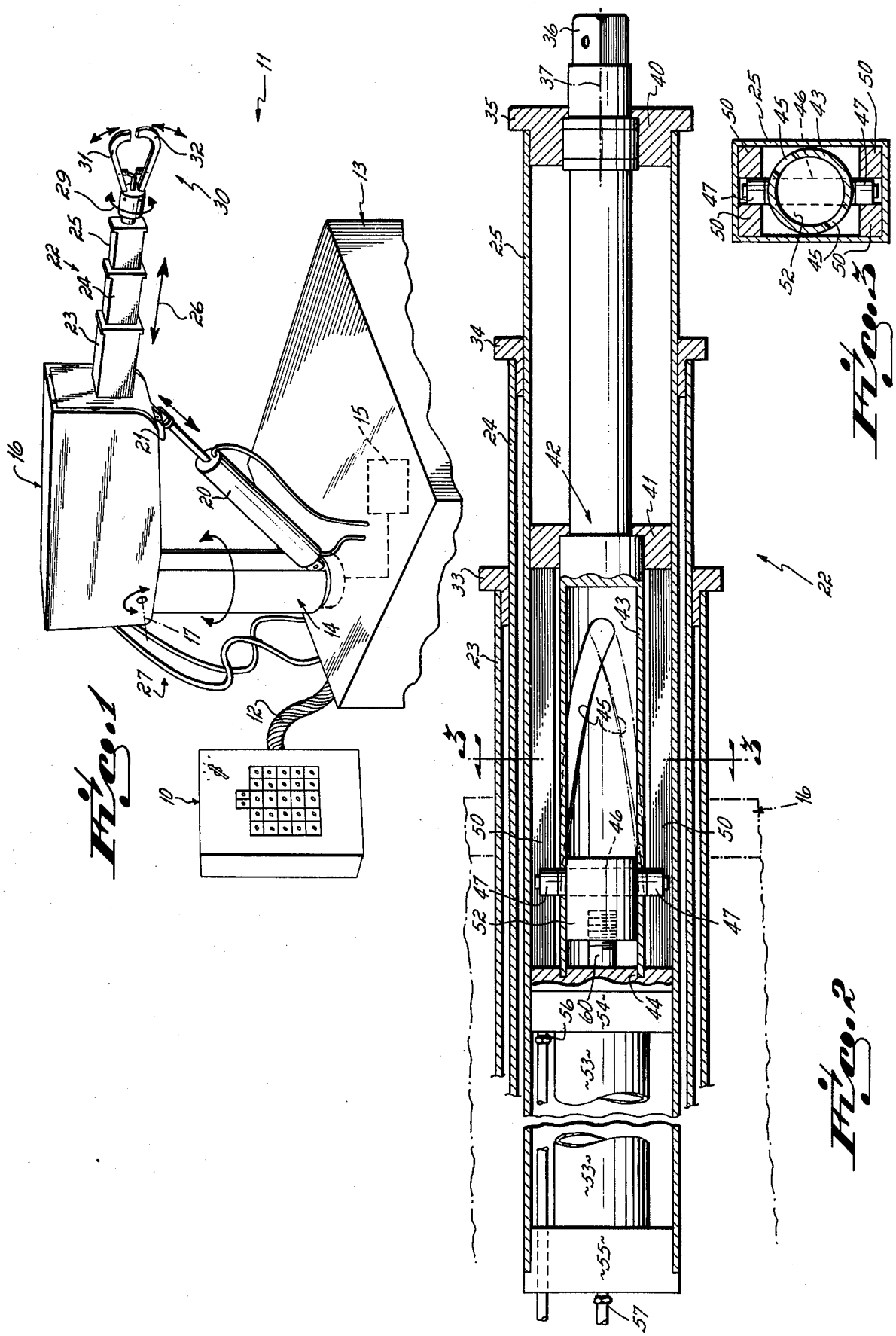

ROTARY WRIST ACTUATOR FOR INDUSTRIAL ROBOTS

BACKGROUND OF THE INVENTION

This invention relates generally to the field of industrial robots usable for grasping, manipulating and otherwise moving, working on, or assembling parts by automated mechanisms and, more particularly, to an improved rotary actuator mechanism for industrial robots for providing wrist-like rotation of a part gripper.

For many years, numerous individuals, industrialists and scientists have become interested in developing mechanical robots for performing numerous activities. For example, industrialists have become increasingly interested in automated machinery for use in manufacturing processes because the increasingly higher cost of labor makes the captital outlay for automated machinery increasingly more attracted as a method of reducing production costs. Indeed, in some applications industrial robots have proved to be far more relaibale than workers because they do not tire, become ill or for any other reason fail to perform the task assigned them. For example, automated machines are used to spot weld automobile frames as they move along the assembly line. Such machines have been able to reliably make more spot weldings at each welding station than workers had heretofor been able to achieve.

Additionally, in view of the greater concern by industrialists, government and labor leaders with the safety of workers employed on assembly lines, industrial robots are finding increasing popularity for use in replacing humans in performing activities which would be hazardous to the employee. For example, industrial robots have been employed to insert as well as remove parts from large stamping presses thereby eliminating the possibility that an employee might accidentally activate the stamping press when one of his limbs was disposed between the moving press members.

Industrial robots have also found application in the performing of mechanical operations in environments which would be hazardous to the health of a human being. Specifically, industrial robots and the like have been used for performing mechanical movement and control activities within nuclear reactors or other environments where the hazard of radiation poisoning is very high.

Although industrial robots do eliminate some labor positions, workers are becoming increasingly disenchanted with assembly line tedium and, therefore, industrial robots, when they replace such jobs, are often welcomed by workers. As such, industrial robots are becoming increasingly popular for automating tedious and boring assembly line tasks heretofore assigned to workers with simple repetative operations being especially adaptable to such automation.

In view of the economical aspects of automation with industrial robots, numerous prior art robots have been manufactured and sold for use in performing various mechanical operations. Typically, these prior art industrial robots include some form of mechanical part gripper for grasping parts or other objects. The mechanical part gripper is then moved by a gripper moving assembly to impart motion thereto for effecting the desired mechanical movement in connection with the mechanical operation being performed on the object held by the gripper. For example, a part might be removed from a storage bin and transported by the gripper to another location and inserted or otherwise connected to another part located at a second location. In order to achieve this objective, however, an apparatus must include apparatus for moving the gripper in various ways to thereby permit the part held by the gripper to be properly positioned to interfit with the second part. As such, these assemblies must include apparatus for actuating the gripper assembly, for providing rotary wrist movement for the gripper and for providing movement of the gripper assembly between at least two points generally along non-straight line paths.

In the past, one of the more difficult movements to provide in such industrial robots has been the rotary wrist-like movement of the part gripper. This has been especially true when rotary wrist actuators were designed for use in robots designed to operate in restricted spaces. The gripper is normally mounted on the forwardmost end of a movable arm-like assembly and the gripping operation is controlled from some other remote location. An actuator must be provided to produce the rotary wrist-like motion of the gripper itself so that a part or object held by the gripper can be reoriented after it has been grasped by the gripper. Since the type of motion required is a rotary motion, some prior art industrial robots have utilized rotary motors mounted in the arm support with long flexible torque tubes to transmit the rotary motion from the motor to the gripper. In other prior art assemblies, rack and pinion drives have been used to produce the desired rotary motion to power the gripper for wrist-like rotation. For industrial robots with limited telescoping movement of the gripper support arm, complicated sliding spline and torque tube arrangements have been utilized to permit transmission of rotary power from the arm support to the gripper.

These prior art rotary wrist actuators for industrial robots, although workable, have a number of defects. In the first place, the prior art approaches for producing the wrist rotation of the gripper have utilized torque tubes to transmit rotary power to the gripper. This construction, however, is not adaptable to robots with long telescopic extension of the boom which supports the gripper because flexible torque tubes or sliding spline arrangements cannot provide a large telescopic extension of the torque tube itself. As such, prior art industrial robots have had grippers mounted on arms or booms with either limited or no telescopic extension capability. In the second place, the prior art approaches for producing rotary wrist motion have been difficult to maintain because the power motor is located on the arm or boom support and the rotary power is transmitted through the arm or boom to the gripper. As such, at least some of the boom and boom support must be disassembled to completely expose the rotor wrist actuator of prior art robots.

In view of the foregoing difficulties associated with prior art devices, it has been a principal objective of this invention to provide a rotary wrist actuator for a part gripper of an industrial robot which will permit the gripper to be located on a telescoping boom assembly where the extent of telescoping is unaffected by the rotary wrist actuator.

It has been a further objective of this invention to provide a rotary wrist actuator for industrial robots having an uncomplicated design and small size thereby permitting its location entirely within the front section of a telescoping boom assembly.

It has been a further objective of this invention to provide a wrist actuator assembly accessably located to permit easy maintenance.

It has been a further objective of this invention to provide a rotary wrist actuator including a linear to rotary motion converter located within the front section of the telescoping boom assembly which will provide more rotary force in a smaller space than has been hereby achievable by prior art rotary wrist actuators.

BRIEF DESCRIPTION OF THE INVENTION

The industrial robot of this invention is generally includes an article handling module which comprises a rotary mounted vertical support member which has a boom support assembly mounted thereto. The vertical support member is rotatable about its longitudinal and substantially vertical axis while the boom support assembly may be rotated about a horizontal axis which is positioned substantially orthogonal to the longitudinal axis of the vertical support member. A telescoping boom is supported by the boom support assembly to thereby provide means for extending or withdrawing a mechanical or other type of gripper disposed at the end of the boom assembly. The gripper itself is operably in a manner well known to grasp or otherwise hold on to parts or other objects. Disposed within the forward section of the telescoping boom assembly is a rotary wrist actuator which provides rotary like wrist movements to the gripper itself and is of a configuration which does not affect the telescoping of the boom in any way. The rotary wrist actuator includes a hydraulically or pneumatically actuated power cylinder disposed within the forward section of the telescoping boom assembly. A cylindrically-shaped drive screw member including helical grooves is engaged by a drive pin connected to the piston rod of the cylinder. As the piston rod of the cylinder is moved along a linear path, the drive pin, in contact with the helical grooves of the drive screw, moves along a linear path to impart rotary motion to the drive screw. The drive screw is rigidly connected to the gripper thereby providing a means for translating linear motion of the pistion rod to rotary wrist-like motion of the gripper.

One primary advantage of the rotary wrist actuator of this invention is that it is readily adaptable to being located entirely within the forwardmost element of the telescoping boom and the actuator, because of its advantageous construction, does not interfere with the telescoping capability of the boom thereby permitting construction of a telescoping boom for an industrial robot with a much greater extension and retraction capability than prior art robots.

Another advantage achieved by the linear to rotary wrist movement actuator of this invention is that the assembly itself can be constructed to include a very small cross-sectional area. As such, the overall dimensions of the telescoping boom assembly can be made very small. Consequently, the industrial robot of the present invention can be made considerably smaller than prior art robots and therefore, operative in much more restricted spaces than prior art industrial robots while retaining the high degree of boom telescoping.

A further advantage of this construction is that the design itself is uncomplicated thereby reducing the necessity of frequent repairs of the rotary wrist actuator.

Furthermore, if maintenance is required, the rotary wrist actuator is located entirely in the front section of the telescoping boom to thereby improve the accessibility to the actuator itself.

The foregoing objects, advantages and features of this invention will become more clear from the following description of a preferred embodiment of the invention taken in connection with the drawings which form a part of the original disclosure.

DESCRIPTION OF THE DRAWINGS

FIG. 1 is a view in perspective of a preferred embodiment of an industrial robot;

FIG. 2 shows a vertical sectional view taken through the telescoping boom assembly of the industrial robot shown in FIG. 1;

FIG. 3 is a vertical sectional view taken along section lines 3—3 of FIG. 2.

DETAILED DESCRIPTION

Referring now to FIG. 1, a perspective view of an industrial robot of this invention is shown. As indicated generally above, industrial robots of the type shown in FIG. 1 are advantageously utilized for automating assembly line procedures in the manufacture and assembly of numerous articles. The industrial robot of FIG. 1 generally includes two modules, a control module shown generally as 10 and an article handling module shown generally as 11. The control module 10 includes electrical circuitry in the form of an electronic computer, and an electro-mechanical sequencer or the like for generating electrical sequence control signals which are transmitted over a control cable 12 to the article handling module 11 for controlling the operation of the article handling module 11. The control module 10 includes circuitry well known in the field of automated machinery and computer controlled machinery and any known apparatus for producing timed and/or sequenced signals can be utilized to control the movements of the article handling module 11.

The article handling module 11 itself includes a base support 13 for supporting the article manipulating apparatus as well as providing a housing for the motors and power controls. In the preferred embodiment, a conventional hydraulic power system is housed in the base support 13 and provides the hydraulic power to actuate the various hydraulic powered elements of the industrial robot. Extending upwardly and substantially vertically from the base support 13 is a vertical support member 14 which is rotatably mounted to the base support 13 for rotation about the longitudinal axis of the vertical support member 14. Included in the base support 13 is an hydraulic motor or other suitable rotary drive means 15, responsive to the control module 10, to provide rotary power to rotate the vertical support member 14 about its longitudinal axis.

Positioned at the upper end of the vertical support member 14 is a boom support assembly shown generally as 16. The boom support assembly is pivotally mounted to the upper and end of the vertical support member 14 for rotation about a horizontal axis 17 which is disposed in substantially orthogonal relationship with the longitudinal axis of the vertical support member 14.

Pivotally mounted near the lower end of the vertical support member 14 is an hydraulically actuated power cylinder 20 which is controllable by the control module 10. The upper end of the power cylinder 20 is attached generally at 21 to the boom support assembly 16, the support point 21 being displaced along the longitudinal axis of the support assembly 16 at a point remote from the horizontal axis 17 to thereby provide the necessary leverage to permit the power cylinder 20 to controllably rotate the boom support assembly 16 about the horizontal axis 17.

Extending outwardly from and disposed substantially along the longitudinal axis of the boom support assembly 16 is a telescoping boom assembly 22. This telescoping boom assembly 22 comprises a plurality of telescopically interfitting sleeves 23, 24 and 25 with the outermost telescopically interfitting sleeve 23 being slidably connected to the boom support assembly 16. The two remaining sleeves 24 and 25 are telescopically movable in the direction indicated by the double-headed arrow 26. In the preferred embodiment, the telescoping boom assembly 22 is preferably hydraulically actuated with the hydraulic fluid being supplied from the base support 13 through a hydraulic fluid line 27 and controlled by the control module 10. As such, the control module 10 can control the telescopic extension and retraction of the telescoping boom assembly 22.

Disposed at the forward end of the telescopic boom assembly and rotatably connected to the innermost telescopically interfitting sleeve 25 is a part gripper 30. The part gripper 30 in one form includes two controllable claw elements 31 and 32 which are also controllable by the control module 10 so that the gripper 30 can be manipulated to grasp and hold a part or other object.

The part gripper 30 is itself mounted for rotation substantially about the longitudinal axis of the telescoping boom assembly 22. A rotary wrist-like movement actuator is disposed within the sleeve 25 to provide rotary wrist-like movement for the gripper 30. This rotary wrist-like motion is shown most advantageously by the double-headed arrow 29.

Generally, the operation of the industrial robot shown in FIG. 1 is as follows. Under the control of the control module 10, the operations of the article handling module 11 are timed and/or controlled. The control module 10 might, for example, actuate the rotating control means 15 to rotate the whole boom support assembly about the vertical axis passing through the vertical support 14. Upon completion of this traversing operation, the control module 10 would then actuate the power cylinder 20 to pivot the boom support assembly 16 about the horizontal axis 17. Then, the telescoping boom assembly 22 would be actuated to extend the mechanical part gripper 30 to a position permitting the gripper to grasp, upon closure thereof, onto a part or other object. Subsequently, the controlling module 10 would actuate, in sequence, the various movable elements of the article handling module 11 thereby moving the grasped object or part from one location to another. Upon completion of the moving operation, the mechanical part gripper 30 would be opened to thereby permit the part or object held between the claws 31 and 32 to be released thus completing the manipulating or moving operation. Under the control of the control module 10, the article handling module would then be returned to another position to permit further and/or other article manipulation to occur.

While the foregoing description has indicated that the control module 10 would be operative for the example described to activate the different motion powering elements of the article handling module 11 in sequence, it will be recognized by those of skill in the art that the control module 10 can be operated in a manner to produce control signals for simultaneously controlling the various powered elements of the article handling module 11. As such, the movement imparted to the mechanical part gripper 30 may be along an irregular or curved path between two points. However, the part or object gripped by the mechanical part gripper 30 can be moved and oriented simultaneously under control of the control module 10. As such, the article manipulation time can be advantageously minimized because an object being moved from one location to a second location will arrive at the second location in proper orientation.

The rotary wrist-like motion actuator assembly in the preferred form of the invention is shown most advantageously in the vertical section view taken through the telescoping boom assembly as shown in FIG. 2. As indicated above, the telescoping boom assembly includes three telescopically interfitting sleeves 23, 24 and 25 with each sleeve being preferably formed of a lightweight and strong metal such as aluminum, in the shape of a tube preferably having a rectangular cross section. For greater strength of the boom assembly a stainless steel construction can be used. The outermost surface for the sleeve 25 slidably interfits with the sleeve 24 to thereby permit the sleeve 25 to move along the longitudinal axis of the telescoping boom assembly. In a similar manner, the sleeve 24 interfits with the sleeve 23 to permit longitudinal sliding movement of sleeve 24 with respect to sleeve 23. Sleeve 23 is telescopically slidable with respect to the telescoping boom support assembly 16 to thereby provide an assembly with three movable interfitting sections for supporting the part gripper and parts held by the gripper. While emphasis has been placed on the preferred embodiment for the telescoping boom assembly, it will be recognized by those of skill in the art that the boom sections do not have to be constructed of rectangular cross section and that circular cross section or triangular cross section may also be used. Furthermore, the number of movable sections for the telescoping boom assembly does not have to be three in number and, indeed, only one telescoping section would be necessary to provide longitudinal movement of the part gripper. The details of the telescoping boom assembly have not been described in details as many telescoping boom assemblies utilized in moving cranes or the like can be used in industrial robots of the invention. However, if longitudinal movement of the mechanical part gripper is not desired, the telescoping boom assembly and its associated control can be eliminated.

Positioned at the forwardmost end of each sleeve 23, 24 and 25 is a stopping flange 33, 34 and 35. These flanges 33, 34 and 35 extend outwardly from the outermost surface of the sleeve 23, 24 and 25 respectively. These stop flanges, as each of the telescopically interfitting sleeves slides leftwardly as viewed in FIG. 2, will prevent the sleeve from sliding inwardly of the next outer sleeve as the stop flange on the forward end of one sleeve will become abutted against the stop flange of the next larger sleeve.

The apparatus for telescopically extending and retracting the sleeves 23, 24 and 25 has not been shown in order to prevent complicating the drawings unnecessarily. Telescoping boom assemblies are well known in the prior art, especially in the field of mobile cranes and are acceptable for application in industrial robots of the type herein described. As such, the actual physical relationship between the sleeves 23, 24 and 25 as well as the stop flanges 33, 34 and 35 is merely included to describe a portion of one preferred telescoping assembly as it is recognized by those of skill in the art that other known and equally acceptable alternative configurations are readily available.

Located at the forwardmost end of the innermost telescopically interfitting sleeve 25 is a rotor member 36 upon which the mechanical part gripper 30 of FIG. 1 is mounted. The rotor member 36 is preferably constructed of a lightweight and strong metal such as aluminum and is mounted for rotary motion substantially about the longitudinal axis 37 of the telescoping boom assembly. The rotor member 36 is rotatably supported by a front bearing 40 which is located at the forwardmost end of the sleeve 25. A second or intermediate support bearing 41 is located at an intermediate point between the ends of sleeve 25 and provides support for the rotor member 36 which is rigidly connected generally at the point shown generally as 42 to a drive screw member 43. The rearmost end of the drive screw member is also supported for rotary movement by a bearing 44. By reason of the three bearings 40, 41 and 44 and the rigid interconnection between rotor member 36 and the drive screw member 43, rotary motion imparted to the drive screw member 43 will be translated through the rigid connection at 42 to the rotor member 36 thereby imparting wristlike rotary movmement to a mechanical part gripper which is affixed (not shown in FIG. 2) to the forwardmost end of the rotor member 36.

The drive screw member 43 generally comprises a cylindrically-shaped body formed of a strong, lightweight metallic material such as hardened steel or the like. Cut through the cylindrical body of the drive screw member 43 are preferably two helical slots 45, although one helical slot or more than two helical slots may be utilized in certain applications. In the preferred embodiment, however, two helical slots 45 are cut through the drive screw member 43 and with each slot 45 being disposed along the drive screw member 43 so that one slot 45 is always disposed directly opposite the other slot 45. This slot arrangement is shown most advantageously in FIG. 3. As such, a guide pin 46 having a longitudinal axis disposed orthogonally to the longitudinal axis of the drive screw member 43 can extend through both helical slots 45. The guide pin 46 is preferably formed of a hard, metallic material such as hardened steel or the like and is preferably cylindrically shaped and has a diameter substantially equal to although slightly less than the width of each helical slot 45 thereby permitting the guide pin 46 to slide or roll freely along each of the helical slots 45. Disposed at the upper and lower ends of the guide pin 46 are needle bearings or bushings 47 which, as viewed most advantageously in FIG. 3, are in rolling contact with guide members 50 which are so disposed with sleeve 25 to form two longitudinal slots for preventing rotation of the guide pin 46 about the longitudinal axis of the telescoping boom assembly.

Disposed interiorly to the drive screw member 43 is a cylindrical plug member 52 freely movable within the drive screw member 43. The cylindrical plug 52 is also constructed with an aperture therethrough for receiving and rigidly supporting the guide pin 46.

A power drive means for providing linear movement is located rearwardly of the bearing 44. The power drive means, in the preferred embodiment of this invention, comprises a hydraulic or pneumatic cylinder 53 which is rigidly secured to the sleeve 25 by a forward support plug 54 and a rear support plug 55. These support plugs 54 and 55 may include fittings 56 and 57 respectively for connecting flexible hydraulic fluid lines to the hydraulic cylinder 53 to thereby provide means for powering the hydraulic cylinder 53 from an external and remotely located hydraulic pumping apparatus. It will be recognized by those of skill in the art, however, that a hydraulic cylinder for providing a linear drive means within the sleeve 25 might be replaced by suitable rack and pinion drives or other linear drive elements.

The hydraulic cylinder 53 is controlled by the hydraulic fluid received through the fittings 56 and 57 to thereby move a driven member in the form of a piston rod 60 in a linear direction substantially parallel to the longitudinal axis of the telescoping boom assembly. The rod 60 extends forwardly of the cylinder 53 and threadably engages the plug 52. The hydraulic cylinder 53 is operative under control of the control module 10 to move the piston rod 60 in a reciprocating manner in a direction substantially parallel to the longitudinal axis of the sleeve 25 to thereby move the guide pin 46 between two positions, the rear position being shown in FIG. 3 and the forwardmost position corresponding to that position where the pin 46 would be disposed when the pin 46 is located at the forwardmost end of each helical slot 45. As such, linear reciprocating movement of the piston rod 60 will impart rotary motion to the rotor member 36 in the following manner. As the hydraulic or pneumatic cylinder 53 is operated by the external hydraulic or pneumatic power source (not shown, the piston rod 60 is extended outwardly from the hydraulic cylinder 53 to thereby force the guide pin 46 in a rightward direction as viewed in FIG. 2. Since the guide members 50 form a longitudinal slot for receiving the needle bearings 47 mounted on the upper and lower ends of the guide pin 46, as the piston rod 60 is moved rightwardly in FIG. 2, the guide pin 46 will be maintained in a perpendicular relationship as shown in FIG. 3. Since the helical slots 45 are in sliding engagement with the pin 46, as the guide pin 46 is moved rightwardly as viewed in FIG. 2, the drive screw member 43 is rotated about its longitudinal axis. Since the rotor member 36 is rigidly connected to the drive screw member 43, the rotary movement of the drive screw 43 is translated to the rotor member 36 thereby providing wrist rotational movement to a mechanical part gripper secured to the forwardmost end of the rotor member 36 (not shown in FIG. 2).

As viewed in FIG. 2, the drive screw member includes two helical slots 45 which are cut through the drive screw member thereby providing a guide slot which will impart a 90° rotational movement to the rotor member 36 whenever the guide pin 46 is moved from the position shown to the forwardmost end of the helical slots 45. It will be recognized by those of skill in the art, however, that the operation of this rotary actuator mechanism need not be limited to imparting only a 90° rotation to the mechanical part gripper. Indeed, by lengthening or shortening the helical slots 45, the amount of rotation imparted to the rotor member 36 may be changed provided sufficient linear movement of the guide pin 46 is available. Since pneumatic cylinders are preferably operated between their fully extended and fully retracted positions, the preferred approach for changing the amount of movement for the guide pin 46 is accomplished by modifying the helical angle associated with each of the helical slots 45. Indeed, by proper design of the helical slots 45, rotational movement of the rotor member 36 varying between 0° rotation and 180° rotation can be provided for the same length of longitudinal movement of the piston rod 60.

While the foregoing discussion has been made with particular emphasis on a preferred embodiment, it will be recognized by those of skill in the art that numerous modifications in form only may be made without departing from the spirit and scope of this invention. For example, it will be recognized by those of skill in the art that the hydraulic or pneumatic cylinder might be operative to move the drive screw member in reciprocating motion and that the rotor member would correspondingly include a guide pin for engaging a helical groove on the drive screw member. As such, longitudinal movement of the drive screw member would be operative to impart rotary motion to the rotor member. Additionally, other linear to rotor motion converting mechanisms may be readily adapted for use within a telescoping boom assembly to thereby provide rotary motion for a part gripper located on the forwardmost end of the telescoping assembly. In another form, the rotor member 36 may be shortened so that the middle bearing 41 can be removed from the assembly thereby reducing cost and weight. These and other modifications may be readily made by those of skill in the art without departing from the spirit and scope of this invention as defined by the following claims:

I claim:

1. In an industrial robot, an apparatus for providing wrist rotation of a part gripper comprising, in combination:
    a telescoping boom assembly with at least one extendable boom member telescopically interfitting with a boom support;
    a power drive means for providing linear movement of a driven member, said driven member being reciprocatable between two positions, said power drive means being fixedly attached to the forwardmost extendable boom member with said driven member being disposed for movement substantially in the direction parallel to the longitudinal axis of said forwardmost boom member;
    a drive screw member rigidly connected to the part gripper and located within said forwardmost boom member comprising a cylindrical body portion having its longitudinal axis disposed substantially parallel to the axis of motion of said driven member, said drive screw member being mounted for rotary motion about its longitudinal axis, said drive screw member including two oppositely disposed helical grooves;
    a helical groove engaging member rigidly affixed to said driven member and engaging both said helical grooves to transmit power from said driven member to said drive screw member; and
    at least one longitudinal track extending in a longitudinal direction substantially parallel to the path of motion of said driven member, said helical groove engaging member also engaging said longitudinal track to thereby prevent rotation of said driven member as the driven member is reciprocated to impart wrist rotation to the part gripper.

2. In an industrial robot, an apparatus for providing wrist rotation of a part gripper comprising, in combination:
    a telescoping boom assembly with at least one extendable boom member telescopically interfitting with a boom support;
    a power drive means for providing a linear movement of a driven member, said driven member being reciprocatable between two positions, said power drive means being fixedly attached to the forwardmost extendable boom member with said driven member being disposed for movement substantially in the direction parallel to the longitudinal axis of said forwardmost boom member;
    a drive screw member rigidly connected to the part gripper and located within said forwardmost boom member comprising a cylindrical body portion having its longitudinal axis disposed substantially coincident with the axis of motion of said driven member, said drive screw member being mounted for rotary motion about its longitudinal axis, said drive screw member including at least one helical groove;
    a helical groove engaging member rigidly affixed to said driven member and engaging each said helical groove to transmit power from said driven member to said drive screw member; and
    at least one longitudinal track extending in a longitudinal direction substantially parallel to the path of motion of said driven member, said helical groove engaging member also engaging said longitudinal track to thereby prevent rotation of said driven member as the driven member is reciprocated to impart wrist rotation to the part gripper.

* * * * *